(12) United States Patent
Choi et al.

(10) Patent No.: US 12,126,017 B2
(45) Date of Patent: Oct. 22, 2024

(54) LITHIUM COMPOSITE OXIDE AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Jun Won Suh, Cheongju-si (KR); Jin Kyeong Yun, Cheongju-si (KR); Jung Han Lee, Cheongju-si (KR); Mi Hye Yun, Cheongju-si (KR); Seung Woo Choi, Cheongju-si (KR); Gwang Seok Choe, Cheongju-si (KR); Ye Ri Jang, Cheongju-si (KR); Joong Ho Bae, Cheongju-si (KR)

(73) Assignee: ECOPRO BM CO., LTD., Cheongju-si (KR)

(*) Notice: Subject to any disclaimer, the term of this patent is extended or adjusted under 35 U.S.C. 154(b) by 595 days.

(21) Appl. No.: 17/035,680

(22) Filed: Sep. 29, 2020

(65) Prior Publication Data
US 2021/0135212 A1 May 6, 2021

(30) Foreign Application Priority Data
Oct. 31, 2019 (KR) .......................... 10-2019-0137149

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/131* (2013.01); *H01M 4/366* (2013.01);
(Continued)

(58) Field of Classification Search
None
See application file for complete search history.

(56) References Cited

U.S. PATENT DOCUMENTS

2005/0106463 A1   5/2005   Kikuchi et al.
2010/0209771 A1*  8/2010   Shizuka .............. H01M 4/5815
                                                    429/231.95
(Continued)

FOREIGN PATENT DOCUMENTS

JP   2004-006277 A   1/2004
JP   2018-073481 A   5/2018
(Continued)

*Primary Examiner* — Wyatt P McConnell
(74) *Attorney, Agent, or Firm* — Studebaker & Brackett PC (57) ABSTRACT

The present invention relates to a lithium composite oxide capable of improving capacity and lifetime characteristics of a lithium secondary battery and a lithium secondary battery including the same. According to the present invention, since the atomic ratio of boron (B) and nickel (Ni) in the surface region of the lithium composite oxide including primary particles enabling lithium intercalation and deintercalation and secondary particles formed by aggregating the primary particles is in a specific range, the stability of the lithium composite oxide may be improved, and thus it is possible to improve the capacity and lifetime characteristics of the lithium secondary battery using the lithium composite oxide as a positive electrode active material.

7 Claims, 8 Drawing Sheets

(51) Int. Cl.
　　　*H01M 4/131*　　　(2010.01)
　　　*H01M 4/36*　　　(2006.01)
　　　*H01M 4/505*　　　(2010.01)
　　　*H01M 10/0525*　　　(2010.01)
　　　*H01M 4/02*　　　(2006.01)

(52) U.S. Cl.
　　　CPC ....... *H01M 4/505* (2013.01); *H01M 10/0525* (2013.01); *C01P 2002/85* (2013.01); *H01M 2004/028* (2013.01); *Y02E 60/10* (2013.01)

(56) References Cited

U.S. PATENT DOCUMENTS

2018/0212237 A1　　7/2018　Lee et al.
2019/0312279 A1　　10/2019　Otsuka et al.

FOREIGN PATENT DOCUMENTS

| KR | 10-2019-0078991 A | 7/2019 |
| KR | 10-2019-0086403 A | 7/2019 |

\* cited by examiner

LITHIUM COMPOSITE OXIDE AND LITHIUM SECONDARY BATTERY COMPRISING THE SAME

CROSS-REFERENCE TO RELATED APPLICATION

This application claims priority to and the benefit of Korean Patent Application No. 10-2019-0137149, filed on Oct. 31, 2019, the disclosure of which is incorporated herein by reference in its entirety.

BACKGROUND

1. Field of the Invention

The present invention relates to a lithium composite oxide which improves capacity and lifetime characteristics of a lithium secondary battery, and a lithium secondary battery including the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

To compensate for such disadvantages, as a positive electrode active material of a secondary battery, a demand for a Ni-rich positive electrode active material having an Ni content of 60% or more has begun to increase. However, while this Ni-rich positive electrode active material exhibits high capacity characteristics, as the Ni content of the positive electrode active material increases, the structural instability due to Li/Ni cation mixing is triggered. Due to the structural instability of the positive electrode active material, a lithium secondary battery may be rapidly deteriorated at high temperature as well as room temperature.

Therefore, there is a demand for development of a positive electrode active material to compensate for the problems of an Ni-rich positive electrode active material.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

Therefore, the present invention is directed to providing an Ni-rich positive electrode active material which is able to improve the efficiency and lifetime characteristics of a lithium secondary battery.

The present invention is also directed to providing a lithium secondary battery using a positive electrode containing the lithium composite oxide defined herein.

The objects of the present invention are not limited to the above-mentioned objects (e.g., for electric cars), and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

Conventionally, the content of a light element present in a lithium composite oxide, such as boron, can only be estimated by the content of a boron-containing raw material added in the preparation of the lithium composite oxide, but it is difficult to specifically confirm which content of the light element in the lithium composite oxide is present based on other elements.

In addition, as a result of diligent examination of the results from repeated experiments, the inventors eventually found that, although the content of the light element-containing raw material added in the preparation of the lithium composite oxide is also important, a main location of the light element in the final product, that is, the lithium composite oxide or the correlation (e.g., content ratio or atomic ratio) between the light element and another metal element in a specific region of the lithium composite oxide is particularly significant.

As a result, the inventors confirmed that the correlation in atomic ratios of nickel, boron, metal elements, M1 and M2, in a surface region of the lithium composite oxide cannot only contribute to the stability of the lithium composite oxide, but also contribute to the improvement in electrochemical characteristics such as efficiency and lifetime characteristics of the lithium secondary battery manufactured using the lithium composite oxide.

Therefore, according to one aspect of the present invention, as a lithium composite oxide including primary particles enabling lithium intercalation and deintercalation and secondary particles formed by aggregating the primary particles, a lithium composite oxide, which includes i) nickel (Ni) and cobalt (Co), ii) at least one selected from manganese (Mn) and aluminum (Al) and iii) boron (B), and in which the atomic ratio of boron (B) and nickel (Ni) in a surface region of the lithium composite oxide is in a specific range, may be provided.

In one embodiment, the lithium composite oxide may be represented by Formula 1 below.

$$Li_wNi_{1-(x+y+z)}Co_xB_yM1_zM2_{z'}O_2 \quad \text{[Formula 1]}$$

(Here,

M1 is at least one selected from Mn and Al,

M2 is at least one selected from Mn, Ba, Ce, Hf, Ta, Cr, F, Mg, Al, Cr, V, Ti, Fe, Zr, Zn, Si, Y, Nb, Ga, Sn, Mo, W, P, Sr, Ge, Nd, Gd and Cu, M1 and M2 are different elements, $0.5 \leq w \leq 1.5$, $0 \leq x \leq 0.50$, $0 < y \leq 0.20$, $0 \leq z \leq 0.20$, and $0 \leq z' \leq 0.20$.)

In addition, in another embodiment of the present invention, the atomic ratios of boron (B) and metal elements, M1 and M2, in a surface region of the lithium composite oxide may be in a specific range.

Moreover, according to another aspect of the present invention, a lithium secondary battery using a positive electrode including the above-described lithium composite oxide may be provided.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material according to the present invention and a lithium secondary battery using a positive electrode including the positive electrode active material will be described in further detail.

Lithium Composite Oxide

According to one aspect of the present invention, a lithium composite oxide including primary particles enabling lithium intercalation and deintercalation and secondary particles in which the primary particles are aggregated is provided. The lithium composite oxide may serve as a positive electrode active material of a lithium secondary battery.

Here, the primary particle refers to one grain or crystallite, and the secondary particle refers to an aggregate formed by aggregating a plurality of the primary particles. The primary particle may have a rod shape, an oval shape and/or an irregular shape. There may be a void and/or a grain boundary between the primary particles constituting the secondary particle.

For example, an inner void may be formed by the primary particle being spaced apart from a neighboring primary particle in the secondary particle. In addition, the primary particles may be in contact with the inner voids without forming a grain boundary by being in contact with neighboring primary particles, thereby forming a surface present inside the secondary particle. Meanwhile, the external atmosphere-exposed surface of the primary particle located on the outermost surface of the secondary particle forms a surface of the secondary particle.

Here, the average major axis length of the primary particle is in a range of 0.1 to 5 μm, and preferably, 0.1 to 2 μm, and thus the optimal density of positive electrodes prepared using positive electrode active materials according to various embodiments of the present invention may be realized. In addition, the average particle diameter of the secondary particles may vary according to the number of aggregated primary particles, but may be in a range of 1 to 30 μm.

In one embodiment, the lithium composite oxide may be a compound including i) nickel (Ni) and cobalt (Co), ii) at least one selected from manganese (Mn) and aluminum (Al) and iii) boron (B). More specifically, the lithium composite oxide may be represented by Formula 1 below.

$$Li_wNi_{1-(x+y+z)}Co_xB_yM1_zM2_{z'}O_2 \quad \text{[Formula 1]}$$

(Here,

M1 is at least one selected from Mn and Al,

M2 is at least one selected from Mn, Ba, Ce, Hf, Ta, Cr, F, Mg, Al, Cr, V, Ti, Fe, Zr, Zn, Si, Y, Nb, Ga, Sn, Mo, W, P, Sr, Ge, Nd, Gd and Cu, M1 and M2 are different elements, $0.5 \leq w \leq 1.5$, $0 \leq x \leq 0.50$, $0 < y \leq 0.20$, $0 \leq z \leq 0.20$, and $0 \leq z' \leq 0.20$.)

Generally, the content of a light element present in a lithium composite oxide, representatively, an element such as boron, may only be estimated by a content of a boron-containing raw material added in the preparation of the lithium composite oxide, but it is difficult to specifically confirm which content of the light element in the lithium composite oxide is present, compared to other elements.

Therefore, the content of a light element-containing raw material added in the preparation of the lithium composite oxide is also very important, but a location where the light element is mainly present in the lithium composite oxide, which is the final product, or a correlation (e.g., a content ratio or atomic ratio) between the light element and a different metal element in a specific region of the lithium composite oxide is particularly important.

In one embodiment of the present invention, the atomic ratio of boron (B) and nickel (Ni) in the surface region of the lithium composite oxide, which can be measured by XPS analysis, may satisfy Expression 1 below.

$$0.2 \leq B/Ni \leq 29.0. \quad \text{[Expression 1]}$$

Here, when the B/Ni in the surface region of the lithium composite oxide is less than 0.2, there is a possibility of lifetime characteristics being degraded. When the B/Ni in the surface region of the lithium composite oxide is more than 29.0, the battery efficiency is reduced so that discharge efficiency also decreases.

In addition, the atomic ratio (B/Ni) of boron (B) and nickel (Ni) in the lithium composite oxide may have a gradient that decreases from the surface region of the lithium composite oxide to the core region of the lithium composite oxide.

As described above, due to the gradient of the atomic ratio of boron and nickel that is shown from the surface region of the lithium composite oxide to the core region of the lithium composite oxide, the structural stability of the lithium composite oxide may increase, and problems such as decreasing battery capacity and increasing resistance may also be prevented.

In addition, the lithium composite oxide may include a coating layer covering at least a part of surface(s) of the primary particle (e.g., the interface between the primary particles) and/or the secondary particle formed by aggregating the primary particles.

For example, the coating layer may be present to cover at least a part of the exposed surface of the primary particle. Particularly, the coating layer may be present to cover at least a part of the exposed surface of the primary particle present on the outermost surface of the secondary particle.

Therefore, the coating layer may be present as a layer that continuously or discontinuously coats the surface(s) of the primary particle and/or the secondary particle formed by aggregating the primary particles. When the coating layer is discontinuously present, it may be formed in an island shape.

In addition, in some cases, the oxide may be present on at least a part of the interface between the primary particles and the surface of the secondary particle, as well as in an inner void formed in the secondary particle.

The coating layer present as described above may contribute to the improvement of physical and electrochemical characteristics of a positive electrode active material.

Here, the coating layer may be present in the form of a solid solution that does not form a boundary between the primary particles and/or the secondary particles formed by aggregating the primary particles, but this is not necessarily the case.

The coating layer may contain a boron (B)-containing oxide. That is, the coating layer may be defined as a region in which a boron-containing oxide is present.

In addition, in another embodiment, the coating layer may further include at least one oxide presented by Formula 2 below.

$$Li_aM3_bO_c$$ [Formula 2]

(Here, M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 6$, $0 \leq b \leq 8$, and $2 \leq c \leq 13$)

When the coating layer further includes at least one oxide represented by Formula 2, the oxide may be an oxide different from a boron-containing oxide.

The oxide represented by Formula 2 may be an oxide in which lithium is complexed with an element represented as M3, or an M3 oxide, in which the oxide may be, for example, $Li_aW_bO_c$, $Li_aZr_bO_c$, $Li_aTi_bO_c$, $Li_aNi_bO_c$, $Li_aCo_bO_c$, $Li_aAl_bO_c$, $CO_bOc$, $Al_bO_c$, $W_bO_c$, $ZrbO_c$ or $Ti_bO_c$. Although the above examples are merely provided for convenience of understanding, the lithium alloy oxide defined in the present invention is not limited to the above examples.

In another exemplary embodiment, the oxide represented by Formula 2 may be or further include an oxide in which lithium is complexed with at least two types of elements represented by M3. The oxide in which lithium is complexed with at least two types of elements represented by M3 may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not limited thereto.

Here, the boron-containing oxide may be a borate-based compound or lithium borate (LBO)-based compound, represented by Formula 3 below, or a composite oxide of a compound (e.g., an oxide represented by Formula 2) different from a compound represented by Formula 3 below.

$$Li_aB_bM4_{b'}O_c$$ [Formula 3]

(Here, M4 is at least one selected from Ni, Mn, Co, Fe, Cu, Nb, Mo, Ti, Al, Cr, Zr, Zn, Na, K, Ca, Mg, Pt, Au, P, Eu, Sm, W, Ce, V, Ba, Ta, Sn, Hf, Ce, Gd and Nd, $0 \leq a \leq 6$, $0 \leq b \leq 8$, $0 \leq b' \leq 8$, and $2 \leq c \leq 13$.)

Non-limiting examples of the boron-containing oxide include $B_2O_3$, $Li_2O\text{—}B_2O_3$, $Li_3BO_3$, $Li_2B_4O_7$, $Li_2B_2O_7$, $Li_2B_8O_{13}$.

In addition, the coating layer may have a form in which both of a boron-containing oxide and the oxide represented by Formula 2 are present in one layer, or in which a boron-containing oxide and the oxide represented by Formula 2 are present in separate layers.

For example, the coating layer may include a first oxide layer having at least one oxide represented by Formula 2 and a second oxide layer having a boron-containing oxide.

Here, the first oxide layer may be present to cover at least a part of the exposed surface (that is, the surface of the secondary particle) of the primary particle present on the outermost surface of the secondary particle. In addition, the second oxide layer may be present to cover at least a part of the exposed surface of the primary particle, which is not covered by the first oxide layer, and the surface of the first oxide layer.

Particularly, as the second oxide layer is present to not entirely cover the exposed surface of the primary particle, which is not covered by the first oxide layer, and the surface of the first oxide layer, lithium ion conductivity may be improved.

As described above, as the lithium composite oxide according to the embodiment includes a coating layer that covers at least a part of surface(s) of the primary particle (e.g., the interface between the primary particles) and/or the secondary particle formed by aggregating the primary particles, structural stability may increase. In addition, such a lithium composite oxide may be used as a positive electrode active material for a lithium secondary battery, thereby improving lifetime and capacity characteristics.

In addition, the coating layer may reduce residual lithium in the lithium composite oxide and act as a diffusion path of lithium ions to have an effect on improving the efficiency of a lithium secondary battery.

Additionally, the oxide may have a concentration gradient that decreases from the surface of the secondary particle to the center of the secondary particle. Therefore, the concentration of the oxide may decrease from the outermost surface of the secondary particle to the center of the secondary particle.

As described above, as the oxide has a concentration gradient that decreases from the surface of the secondary particle to the center of the secondary particle, residual lithium present on the surface of the positive electrode active material is effectively reduced, thereby preventing side effects caused by unreacted residual lithium in advance. In addition, a decrease in crystallinity in the internal region of the surface of the positive electrode active material due to the oxide may be prevented. In addition, the collapse of the entire structure of the positive electrode active material by the oxide during an electrochemical reaction may be prevented.

Lithium Secondary Battery

Another aspect of the present invention may provide a positive electrode including a positive electrode current collector and a positive electrode active material layer formed on the positive electrode current collector. Here, the positive electrode active material layer may include, as a positive electrode active material, any one of the lithium composite oxides according to various embodiments of the present invention described above.

Therefore, detailed description of the lithium composite oxide will be omitted, and hereinafter, other components that have not been described will be described. In addition, for convenience, the above-described lithium composite oxide will be referred to as a positive electrode active material below.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 µm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and roll-pressing the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder selectively included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbonaceous material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a migration path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1. Preparation of Lithium Composite Oxide (1) Example 1

First, a lithium composite oxide was prepared by preparing nickel sulfate, cobalt sulfate and manganese sulfate, synthesizing a precursor through co-precipitation, and adding LiOH to the synthesized precursor and performing sintering. Specifically, a lithium composite oxide was obtained by mixing LiOH with a precursor, elevating a temperature 1° C. per minute up to 790° C. in a sintering furnace while maintaining an $O_2$ atmosphere to perform thermal treatment for 10 hours, and then natural cooling the sintered product.

Subsequently, distilled water was input into the lithium composite oxide and washed for 1 hour, and then the washed lithium composite oxide was filtered and dried.

Afterward, the lithium composite oxide and a B-containing raw material ($H_3BO_3$) were mixed together and thermally treated using a hot plate stirrer. The B-containing raw material ($H_3BO_3$) was mixed to be 0.3 wt % with respect to the total weight of the lithium composite oxide, and the mixture was thermally treated by elevating the temperature 1° C. per minute in an $O_2$ atmosphere for 5 hours while stirring, and then naturally cooled, thereby ultimately obtaining a lithium composite oxide.

(2) Example 2

First, a lithium composite oxide was prepared by preparing nickel sulfate, cobalt sulfate and manganese sulfate, synthesizing a precursor through co-precipitation, and adding LiOH to the synthesized precursor and performing sintering. Specifically, a lithium composite oxide was obtained by mixing LiOH and $H_3BO_3$ with a precursor, elevating a temperature 1° C. per minute up to 790° C. in a sintering furnace while maintaining an $O_2$ atmosphere to perform thermal treatment for 10 hours, and then natural cooling the sintered product.

Subsequently, distilled water was input into the lithium composite oxide and washed for 1 hour, and then the washed lithium composite oxide was filtered and dried.

Afterward, the lithium composite oxide and a B-containing raw material ($H_3BO_3$) were mixed together and thermally treated using a hot plate stirrer. The B-containing raw material ($H_3BO_3$) was mixed to be 0.3 wt % with respect to the total weight of the lithium composite oxide, and the mixture was thermally treated by elevating the temperature 1° C. per minute in an $O_2$ atmosphere for 5 hours while stirring, and then naturally cooled, thereby ultimately obtaining a lithium composite oxide.

(3) Example 3

First, a lithium composite oxide was prepared by preparing nickel sulfate, cobalt sulfate and manganese sulfate, synthesizing a precursor through co-precipitation, and adding LiOH, $Al_2O_3$, $TiO_2$ and $ZrO_2$ and performing sintering. Specifically, a lithium composite oxide was obtained by mixing LiOH, $Al_2O_3$, $TiO_2$ and $ZrO_2$ with a precursor, elevating a temperature 1° C. per minute up to 790° C. in a sintering furnace while maintaining an $O_2$ atmosphere to perform thermal treatment for 10 hours, and then natural cooling the sintered product.

Subsequently, distilled water was input into the lithium composite oxide and washed for 1 hour, and then the washed lithium composite oxide was filtered and dried.

Afterward, the lithium composite oxide and a B-containing raw material ($H_3BO_3$) were mixed together and thermally heated using a hot plate stirrer. The B-containing raw material ($H_3BO_3$) was mixed to be 0.3 wt % with respect to the total weight of the lithium composite oxide, and the mixture was thermally treated by elevating the temperature 1° C. per minute in an O₂ atmosphere for 5 hours while stirring, and then naturally cooled, thereby ultimately obtaining a lithium composite oxide.

(4) Example 4

First, a lithium composite oxide was prepared by preparing nickel sulfate, cobalt sulfate and manganese sulfate, synthesizing a precursor through co-precipitation, and adding LiOH to the synthesized precursor and performing sintering. Specifically, a lithium composite oxide was obtained by mixing LiOH with a precursor, elevating a temperature 1° C. per minute up to 790° C. in a sintering furnace while maintaining an O₂ atmosphere to perform thermal treatment for 10 hours, and then natural cooling the sintered product.

Subsequently, distilled water was input into the lithium composite oxide and washed for 1 hour, and then the washed lithium composite oxide was filtered and dried.

Afterward, the lithium composite oxide, a B-containing raw material (H₃BO₃), an Al-containing raw material (Al₂O₃), a Ti-containing raw material (TiO₂) and a Zr-containing raw material (ZrO₂) were mixed together and thermally treated using a hot plate stirrer. The B-containing raw material (H₃BO₃) was mixed to be 0.3 wt % with respect to the total weight of the lithium composite oxide, and the mixture was thermally treated by elevating the temperature 1° C. per minute in an O₂ atmosphere for 5 hours while stirring, and then naturally cooled, thereby ultimately obtaining a lithium composite oxide.

(5) Example 5

A lithium composite oxide was prepared in the same manner as described in Example 1, except that the B-containing raw material (H₃BO₃) was mixed with the lithium composite oxide to be 0.06 wt % with respect to the total weight in Example 1.

(6) Example 6

A lithium composite oxide was prepared in the same manner as described in Example 1, except that the B-containing raw material (H₃BO₃) was mixed with the lithium composite oxide to be 0.55 wt % with respect to the total weight in Example 1.

(7) Example 7

A lithium composite oxide was prepared in the same manner as described in Example 1, except that the B-containing raw material (H₃BO₃) was mixed with the lithium composite oxide to be 0.9 wt % with respect to the total weight in Example 1.

(8) Comparative Example 1

A lithium composite oxide was prepared in the same manner as described in Example 1, except that the washed lithium composite oxide was filtered and dried, and mixed with the B-containing raw material (H₃BO₃) using a mixer, and the resulting product was thermally treated for 5 hours by elevating a temperature 2° C. per minute while maintaining an O₂ atmosphere in a sintering furnace, and then naturally cooled.

(9) Comparative Example 2

A lithium composite oxide was prepared in the same manner as described in Example 2, except that the washed lithium composite oxide was filtered and dried, and mixed with the B-containing raw material (H₃BO₃) using a mixer, and the resulting product was thermally treated for 5 hours by elevating a temperature 2° C. per minute while maintaining an O₂ atmosphere in a sintering furnace, and then naturally cooled.

(10) Comparative Example 3

A lithium composite oxide was prepared in the same manner as described in Example 3, except that the washed lithium composite oxide was filtered and dried, and mixed with the B-containing raw material (H₃BO₃) using a mixer, and the resulting product was thermally treated for 5 hours by elevating a temperature 2° C. per minute while maintaining an O₂ atmosphere in a sintering furnace, and then naturally cooled. In addition, during the mixing, the B-containing raw material (H₃BO₃) was mixed to be 1.0 wt % with respect to the total weight of the lithium composite oxide.

(11) Comparative Example 4

A lithium composite oxide was prepared in the same manner as described in Example 4, except that the washed lithium composite oxide was filtered and dried, and mixed with the B-containing raw material (H₃BO₃), the Al-containing raw material (Al₂O₃), the Ti-containing raw material (TiO₂) and the Zr-containing raw material (ZrO₂) using a mixer, and the resulting product was thermally treated for 5 hours by elevating a temperature 2° C. per minute while maintaining an O₂ atmosphere in a sintering furnace, and then naturally cooled. In addition, during the mixing, the B-containing raw material (H₃BO₃) was mixed to be 1.2 wt % with respect to the total weight of the lithium composite oxide.

Table 1 below shows compositions of the lithium composite oxides prepared according to examples and comparative examples. The compositions of the lithium composite oxides were obtained through ICP analysis.

TABLE 1

| Classification | Li/Metal (molar ratio) | Molar ratio | | | B (ppm) | Al (ppm) | Ti (ppm) | Zr (ppm) | B/Ni |
| | | Ni/(Ni + Co + Mn) | Co/(Ni + Co + Mn) | Mn/(Ni + Co + Mn) | | | | | |
| --- | --- | --- | --- | --- | --- | --- | --- | --- | --- |
| Example 1 | 1.03 | 80 | 8 | 12 | 545 | 0 | 0 | 0 | 0.0062 |
| Example 2 | 1.04 | 80 | 8 | 12 | 861 | 0 | 0 | 0 | 0.0103 |
| Example 3 | 1.03 | 80 | 8 | 12 | 536 | 1625 | 1225 | 1033 | 0.0064 |
| Example 4 | 1.02 | 80 | 8 | 12 | 550 | 1651 | 1212 | 1028 | 0.0064 |
| Example 5 | 1.03 | 80 | 8 | 12 | 118 | 0 | 0 | 0 | 0.0013 |
| Example 6 | 1.02 | 80 | 8 | 12 | 1037 | 0 | 0 | 0 | 0.0113 |

TABLE 1-continued

| Classification | Li/Metal (molar ratio) | Molar ratio Ni/ (Ni + Co + Mn) | Co/ (Ni + Co + Mn) | Mn/ (Ni + Co + Mn) | B (ppm) | Al (ppm) | Ti (ppm) | Zr (ppm) | B/Ni |
|---|---|---|---|---|---|---|---|---|---|
| Example 7 | 1.03 | 80 | 8 | 12 | 1702 | 0 | 0 | 0 | 0.0192 |
| Comparative Example 1 | 1.03 | 80 | 8 | 12 | 551 | 0 | 0 | 0 | 0.0006 |
| Comparative Example 2 | 1.04 | 80 | 8 | 12 | 875 | 0 | 0 | 0 | 0.0011 |
| Comparative Example 3 | 1.03 | 80 | 8 | 12 | 1766 | 1631 | 1287 | 1029 | 0.0202 |
| Comparative Example 4 | 1.02 | 80 | 8 | 12 | 2198 | 1660 | 1206 | 1042 | 0.0255 |

Experimental Example 2. Results of XPS Analysis of Lithium Composite Oxides

XPS analysis was performed on the lithium composite oxides prepared according to Examples and Comparative Examples to confirm the compositions of elements in the surface region of the lithium composite oxides. The XPS analysis was performed using Quantum 2000 (acceleration voltage: 0.5 to 15 keV, 300 W, energy resolution: approx. 1.0 eV, minimum analysis area: 10 microns, Sputter rate: 0.1 nm/min).

Table 2 below shows compositions of elements in the surface region of the lithium composite oxides prepared according to examples and comparative examples according to the XPS analysis. The composition of the elements in the surface region of each lithium composite oxide listed in Table 2 below indicates the composition of elements present from the outermost surface of the lithium composite oxide to a depth of 10 nm.

TABLE 2

| Classification | Ni | Co | Mn | B | Al | Ti | Zr | B/Ni |
|---|---|---|---|---|---|---|---|---|
| Example 1 | 4.38 | 0.95 | 2.31 | 15.49 | 0 | 0 | 0 | 3.54 |
| Example 2 | 4.11 | 0.88 | 2.06 | 15.98 | 0 | 0 | 0 | 3.89 |
| Example 3 | 4.01 | 0.73 | 1.97 | 13.88 | 0.31 | 0.15 | 0.02 | 3.46 |
| Example 4 | 3.18 | 0.57 | 1.56 | 11.76 | 3.12 | 1.61 | 0.13 | 3.70 |
| Example 5 | 9.45 | 1.54 | 3.33 | 2.01 | 0 | 0 | 0 | 0.21 |
| Example 6 | 2.09 | 0.41 | 1.34 | 22 | 0 | 0 | 0 | 10.5 |
| Example 7 | 0.87 | 0.18 | 0.61 | 25.9 | 0 | 0 | 0 | 28.8 |
| Comparative Example 1 | 7.01 | 1.38 | 3.17 | 0.45 | 0 | 0 | 0 | 0.06 |
| Comparative Example 2 | 6.87 | 1.23 | 2.99 | 1.16 | 0 | 0 | 0 | 0.17 |
| Comparative Example 3 | 0.64 | 0.15 | 0.43 | 21.02 | 0.12 | 0.06 | 0.01 | 32.84 |
| Comparative Example 4 | 0.51 | 0.14 | 0.42 | 25.31 | 0.43 | 1.47 | 0.1 | 49.63 |

Subsequently, etching was performed to a depth of approximately 25 nm from the outermost surface of each of the lithium composite oxides according to Examples 1 to 4 by an XPS depth profile analysis method (Ion energy: 2000 eV, spot size: 200 μm), and then through XPS analysis, the atomic ratio of boron and nickel was analyzed. Likewise, the lithium composite oxide which was surface-etched once was etched again by the same method, and then the atomic ratio of boron and nickel was analyzed through XPS analysis, thereby confirming whether the B/Ni ratio changes from the surface region to the core region of the lithium composite oxide. The XPS analysis results are shown in Table 3 below.

TABLE 3

| Classification | $1^{st}$-B/Ni | $2^{nd}$-B/Ni |
|---|---|---|
| Example 1 | 0.86 | 0.52 |
| Example 2 | 0.91 | 0.59 |
| Example 3 | 0.84 | 0.49 |
| Example 4 | 0.75 | 0.44 |

Referring to the results shown in Table 3, it can be confirmed that B/Ni in a lithium composite oxide confirmed through XPS analysis has a concentration gradient that decreases from the surface region to the core region of the lithium composite oxide. According to the direction of the B/Ni concentration gradient, it is possible to minimize a decrease in battery capacity of the used lithium secondary battery and improve lifetime characteristics.

TABLE 4

| Classification | X | Y | Y/X |
|---|---|---|---|
| Example 1 | 0.0062 | 3.54 | 570.97 |
| Example 2 | 0.0103 | 3.89 | 377.67 |
| Example 3 | 0.0064 | 3.46 | 540.63 |
| Example 4 | 0.0064 | 3.70 | 578.13 |
| Example 5 | 0.0013 | 0.21 | 161.54 |
| Example 6 | 0.0113 | 10.5 | 929.20 |
| Example 7 | 0.0192 | 28.8 | 1500.00 |
| Comparative Example 1 | 0.0006 | 0.06 | 100.00 |
| Comparative Example 2 | 0.0011 | 0.17 | 154.55 |
| Comparative Example 3 | 0.0202 | 32.84 | 1625.74 |
| Comparative Example 4 | 0.0255 | 49.63 | 1946.27 |

Table 4 shows ratios of atomic ratios (X) of boron and nickel in the total compositions of the lithium composite oxides listed in Table 1 and atomic ratios (Y) of boron and nickel in the surface regions of the lithium composite oxides listed in Table 2.

Referring to Table 4, it can be confirmed that the atomic ratio of boron and nickel in the surface region of the lithium composite oxide is higher than that in the total composition of the lithium composite oxide. Particularly, it can be confirmed that the ratio of the atomic ratio of boron and nickel in the surface region of the lithium composite oxide and the atomic ratio of boron and nickel in the total composition of the lithium composite oxide is at least 160 to 1500.

As the ratio of the atomic ratio of boron and nickel in the surface region of the lithium composite oxide and the atomic ratio of boron and nickel in the total composition of the lithium composite oxide is 100 to 1500, it is possible to minimize a decrease in battery capacity of the lithium secondary battery using the lithium composite oxide and improve lifetime characteristics.

Figure 1:
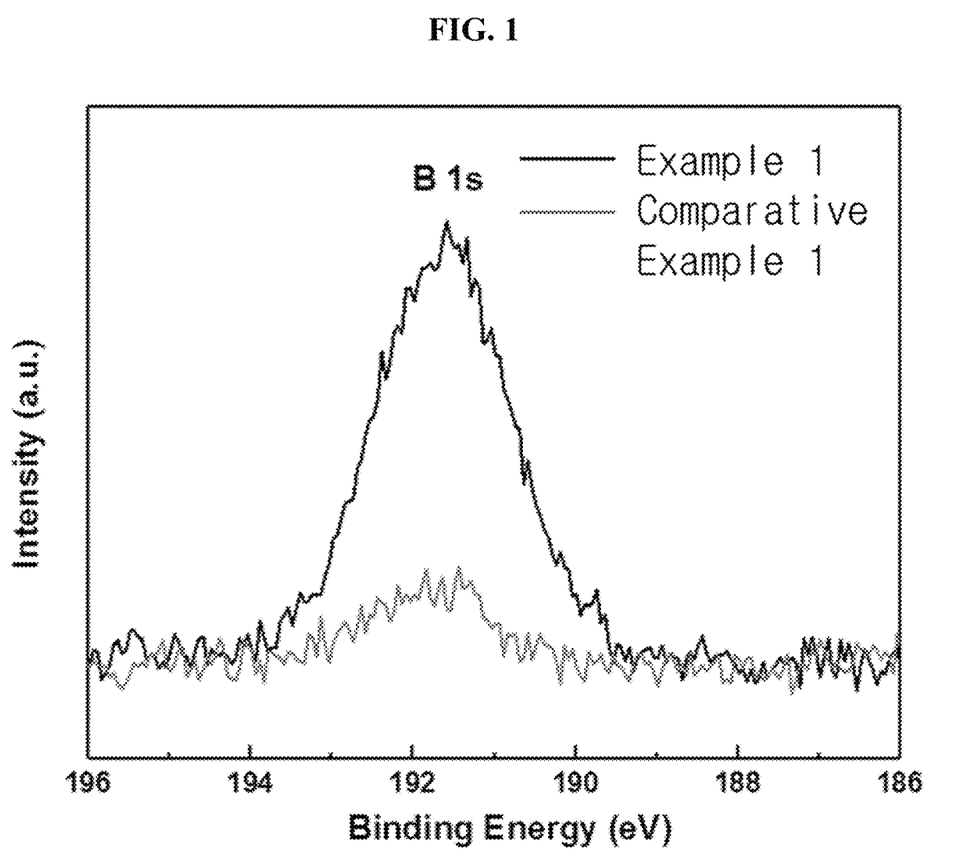
FIGS. 1 to 7 are graphs showing XPS analysis results for lithium composite oxides prepared according to Examples and Comparative Examples.
Figure 2:
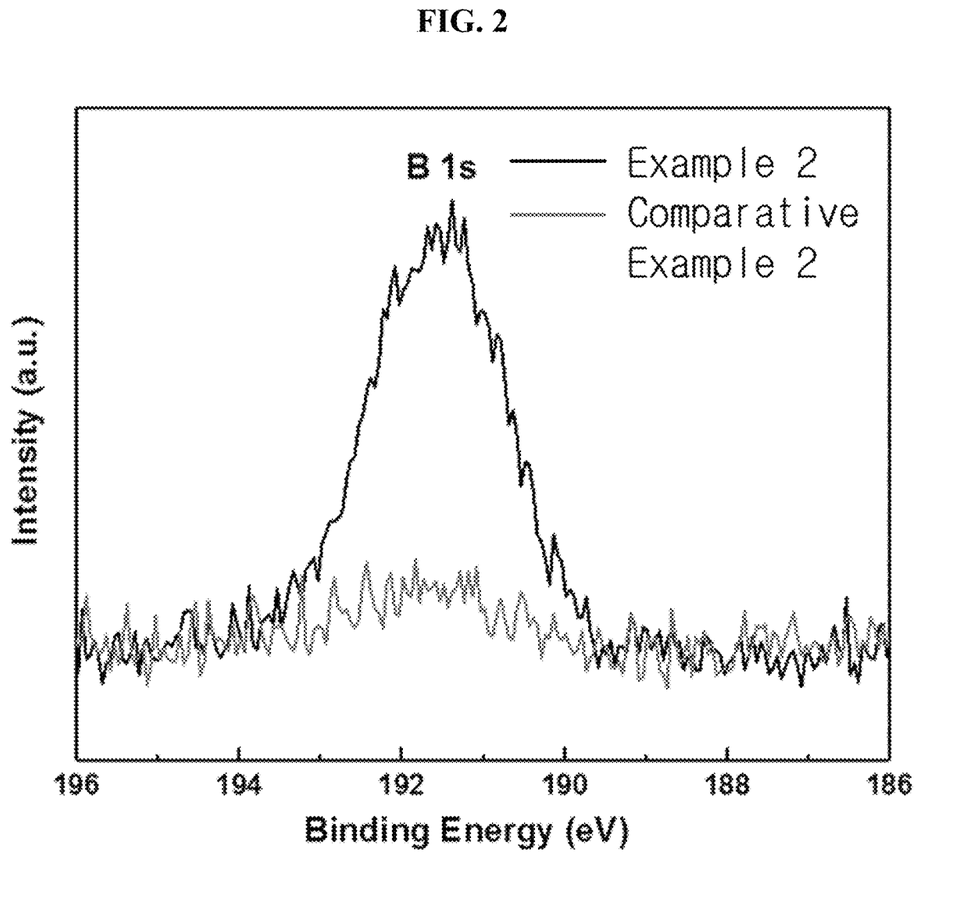
Figure 3:
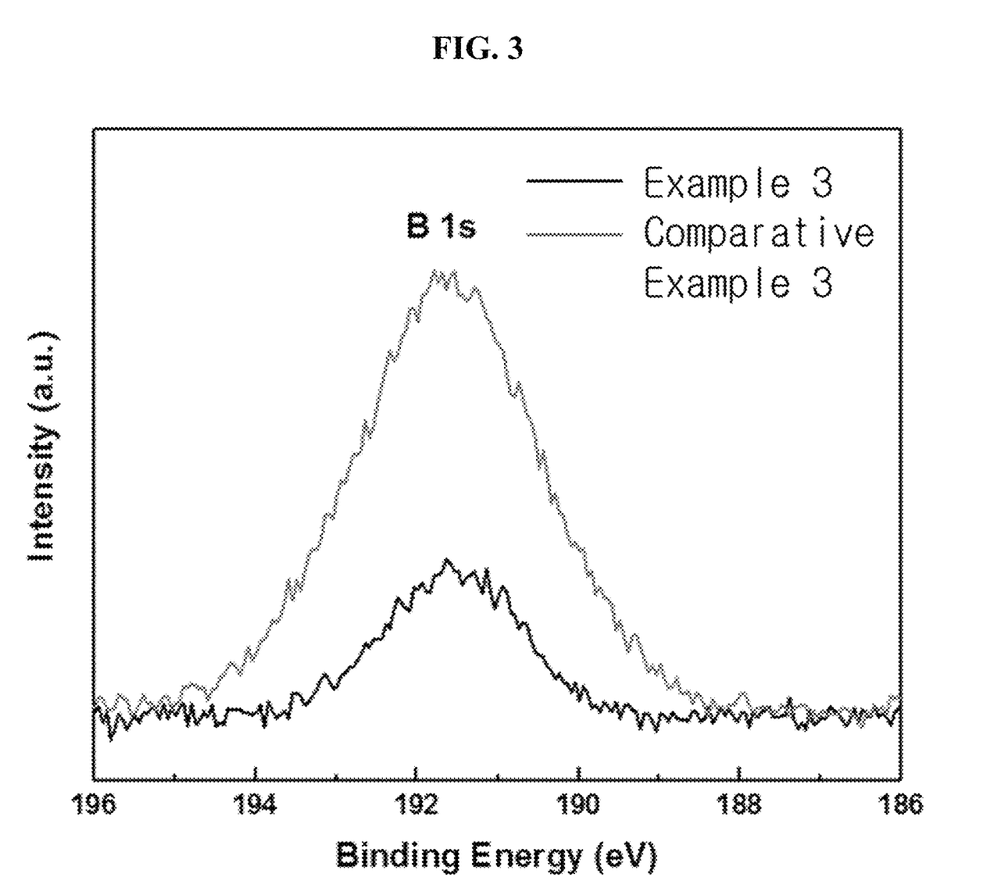
Figure 4:
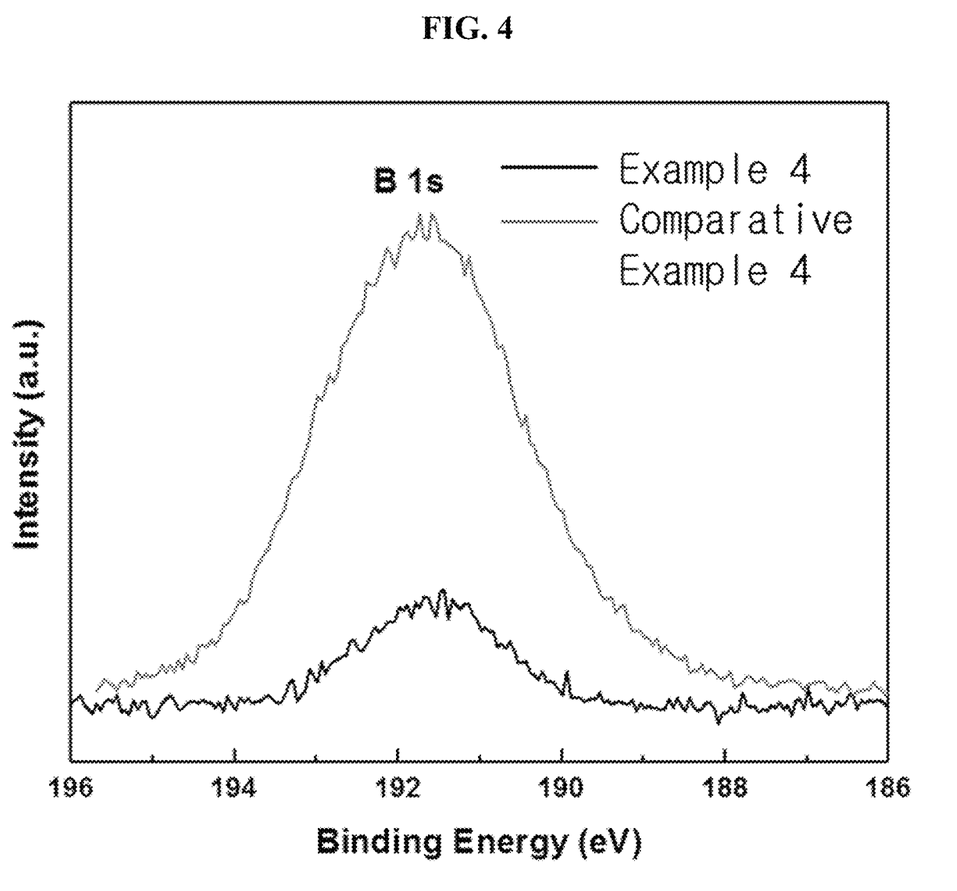
Figure 5:
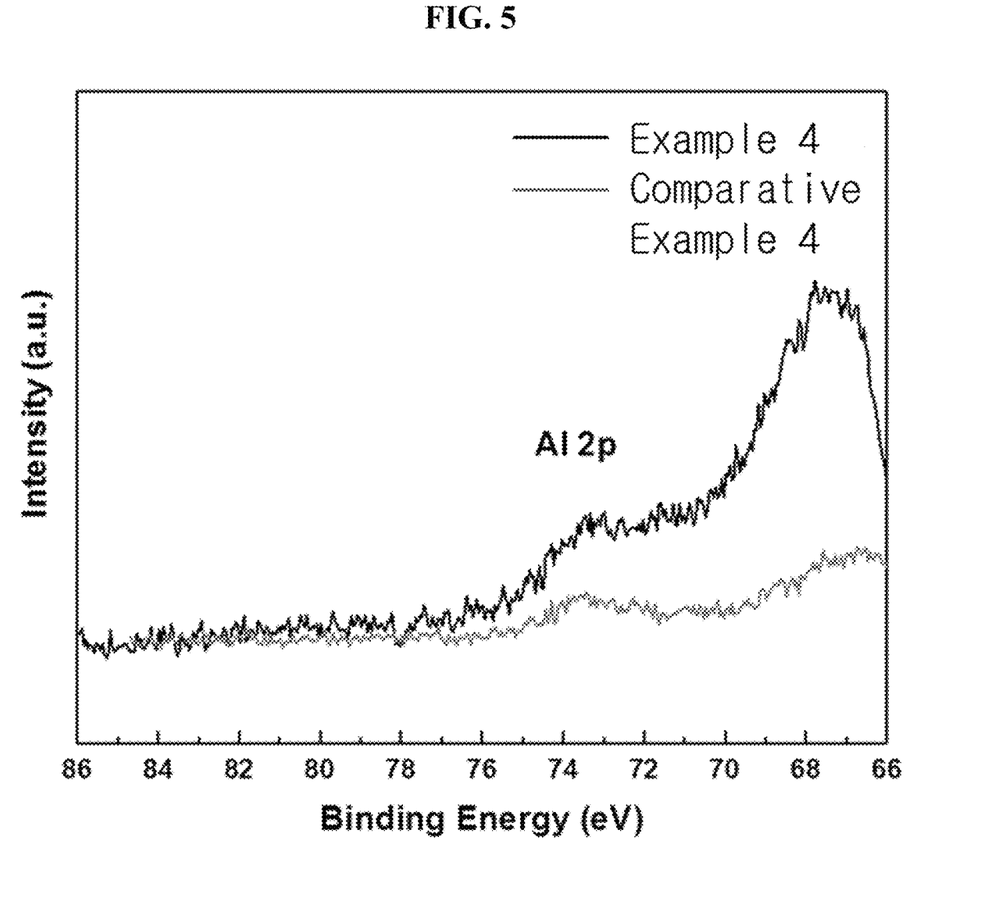
Figure 6:
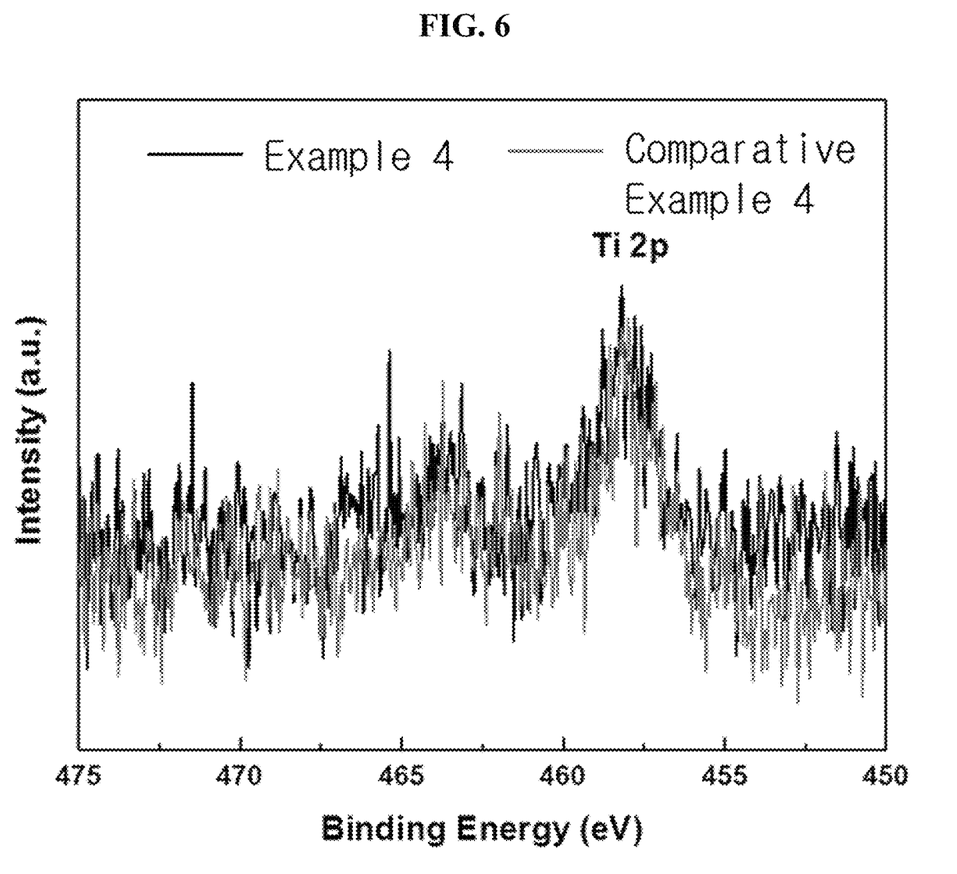
Figure 7:
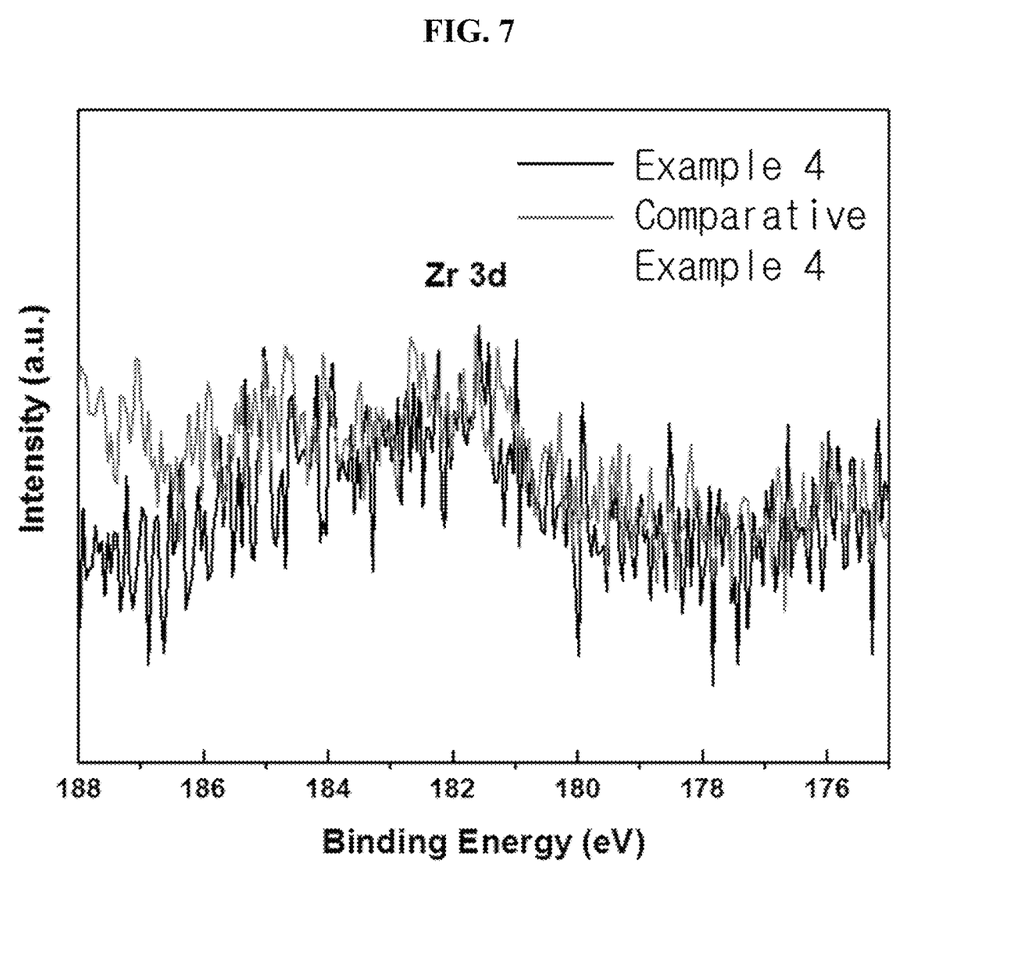

In addition, FIG. 1 is a graph showing the XPS analysis results for the lithium composite oxides prepared according to Example 1 and Comparative Example 1, FIG. 2 is a graph showing the XPS analysis results for the lithium composite oxides prepared according to Example 2 and Comparative Example 2, FIG. 3 is a graph showing the XPS analysis results for the lithium composite oxides prepared according to Example 3 and Comparative Example 3, and FIGS. 4 to 7 are graphs showing the XPS analysis results for the lithium composite oxides prepared according to Example 4 and Comparative Example 4.

Referring to FIGS. 1 to 3, all of the lithium composite oxides prepared according to Examples 1 to 3 and Comparative Examples 1 to 3 show a B 1s peak, confirming that a B-containing oxide coating layer is formed on the surface of each of the lithium composite oxides prepared according to Examples and Comparative Examples.

Meanwhile, referring to FIGS. 4 to 7, both of the lithium composite oxides prepared according to Examples 4 and Comparative Example 4 additionally show Al 2p, Ti 2p and Zr 3d peaks, confirming that a B-containing oxide coating layer as well as a coating layer containing an Al-containing oxide, a Ti-containing oxide and a Zr-containing oxide are additionally formed on the surface of each of the lithium composite oxides prepared according to Example 4 and Comparative Example 4.

Experimental Example 3. XRD Analysis Results of Lithium Composite Oxides

XRD analysis was performed on the lithium composite oxides prepared according to Examples 1 to 4 and Comparative Examples 1 to 4.

In the XRD analysis, as an X-ray source, a Cu-Kα α1 radiation source was used, and measurement was performed at 0.02° step intervals within a 10° to 70° (2θ) range by a θ-2θ scan (Bragg-Brentano parafocusing geometry) method.

Figure 8:
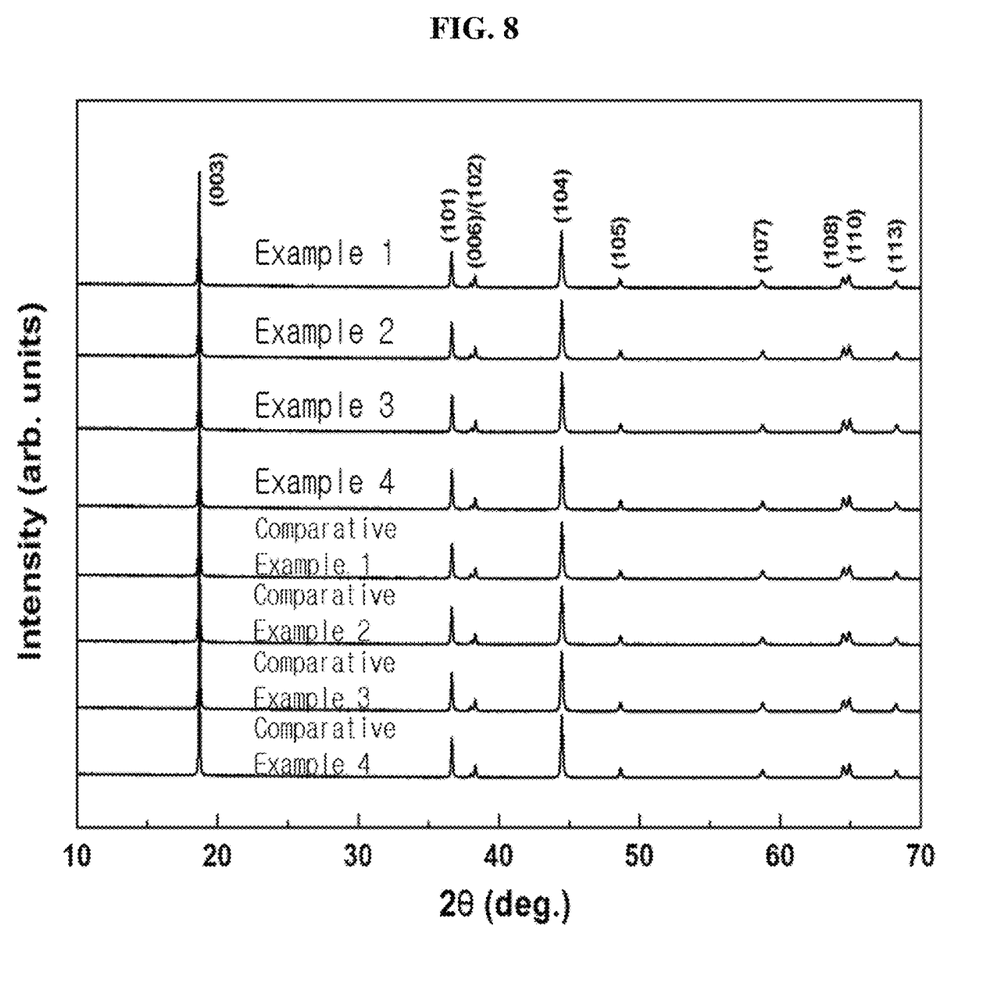
FIG. 8 is a graph showing XRD analysis results for lithium composite oxides prepared according to Examples and Comparative Examples.

Referring to FIG. 8 showing the XRD analysis results for the lithium composite oxides prepared according to Examples 1 to 4 and Comparative Example 1 to 4, it can be confirmed that all of the lithium composite oxides according to Examples and Comparative Examples have a hexagonal lattice structure (hexagonal α-NaFeO$_2$) with an R-3m space group. In addition, although not illustrated separately, it was able to be confirmed that all of the lithium composite oxides prepared according to Examples 5 to 7 have a hexagonal lattice structure with an R-3m space group.

Experimental Example 4. Result of Evaluating Characteristics of Lithium Secondary Battery (1) Manufacture of Lithium Secondary Battery A slurry was prepared by mixing each of the lithium composite oxides prepared according to Examples 1 to 4, artificial graphite as a conductive material, and polyvinylidene fluoride (PVDF) as a binder in a weight ratio of 92:4:4. A positive electrode for a lithium secondary battery was manufactured by uniformly applying the slurry on an aluminum film having a thickness of 15 μm and vacuum-drying the coated aluminum film at 135° C.

A coin cell battery was manufactured according to a conventionally known manufacturing process using the positive electrode, a lithium foil as a counter electrode, a porous polyethylene film (Celgard 2300, thickness: 25 μm) as a separator, and a liquid electrolyte solution in which LiPF$_6$ was dissolved in a solvent prepared by mixing ethylene carbonate and ethyl methyl carbonate at a volume ratio of 3:7 at a concentration of 1.15M.

(2) Evaluation of Capacity Characteristics of Lithium Secondary Battery

A charge/discharge test was performed on the lithium secondary battery manufactured by the above-described method at 25° C. in a voltage range of 3.0V to 4.3V with discharge rate of 0.1 C to 5.0 C using an electrochemical analyzer (Toyo, Toscat-3100) to measure charge capacity, discharge capacity, charge/discharge efficiency and lifetime characteristics. The lifetime characteristic was measured with a capacity maintenance rate, which is a ratio of the discharge capacity at the 50th cycle to initial capacity after 50 cycles of charging/discharging under conditions for the charge/discharge test. The measurement results are shown in Table 5 below.

TABLE 5

| Classification | Charge capacity (mAh/g) | Discharge capacity (mAh/g) | Charge/discharge efficiency (%) | Lifetime (%) |
| --- | --- | --- | --- | --- |
| Example 1 | 221.7 | 202.9 | 91.5 | 94.5 |
| Example 2 | 221.5 | 203.1 | 91.7 | 95.1 |
| Example 3 | 222.2 | 203.5 | 91.6 | 95.5 |
| Example 4 | 220.8 | 203.4 | 92.1 | 94.8 |
| Example 5 | 221.4 | 203.5 | 91.9 | 94.1 |
| Example 6 | 221.9 | 203 | 91.5 | 95.3 |
| Example 7 | 221.8 | 202.7 | 91.4 | 95.5 |
| Comparative Example 1 | 221.6 | 202.5 | 91.4 | 91.2 |
| Comparative Example 2 | 222.1 | 203.2 | 91.5 | 90.9 |
| Comparative Example 3 | 219.4 | 194.2 | 88.5 | 96.1 |
| Comparative Example 4 | 217.6 | 185.6 | 85.3 | 97.2 |

Referring to the results of Table 5, the charge capacities of the lithium secondary batteries manufactured using the lithium composite oxides according to Examples and Comparative Examples are at similar levels, but it can be confirmed that the lithium secondary batteries using the positive electrode active materials according to Examples have superior lifetime characteristics, compared to Comparative Examples 1 and 2, and have high charge/discharge efficiency, compared to Comparative Example 3 and 4.

According to the present invention, as the atomic ratio of boron (B) and nickel (Ni) in the surface region of a lithium composite oxide including a primary particle enabling lithium intercalation and deintercalation and secondary particles formed by aggregating the primary particles, the stability of the lithium composite oxide can be improved, and thus the capacity and lifetime characteristics of a lithium secondary battery using the lithium composite oxide as a positive electrode active material can be improved.

Above, while the examples of the present invention have been described, it will be understood by those of ordinary skill in the art that the present invention may be changed and modified in various ways by addition, alteration, or deletion of components without departing from the spirit of the present invention defined in the appended claims, and also included in the scoped of the present invention.

What is claimed is:

1. A lithium composite oxide, comprising:
primary particles enabling lithium intercalation and deintercalation and secondary particles formed by aggregating the primary particles,
wherein the lithium composite oxide comprises i) nickel (Ni) and cobalt (Co), ii) at least one selected from manganese (Mn) and aluminum (Al) and iii) boron (B),
wherein the atomic ratio of boron (B) and nickel (Ni) in a surface region of the secondary particles satisfies Expression 1 below:

$$0.2 \leq B/Ni \leq 29.0,$$ [Expression 1]

wherein the surface region is from the outermost surface of the secondary particles to a depth of 10 nm of the secondary particles, and
wherein a ratio of the atomic ratio of boron (B) and nickel (Ni) in the surface region of the secondary particles and the atomic ratio of boron (B) and nickel (Ni) in the total composition of the secondary particles is 160 to 1,500.

2. The lithium composite oxide of claim 1, wherein the lithium composite oxide is represented by Formula 1 below:

$$Li_wNi_{1-(x+y+z)}Co_xB_yM1_zM2_{z'}O_2$$ [Formula 1]

(Here,
M1 is at least one selected from Mn and Al,
M2 is at least one selected from Mn, Ba, Ce, Hf, Ta, Cr, F, Mg, Al, Cr, V, Ti, Fe, Zr, Zn, Si, Y, Nb, Ga, Sn, Mo, W, P, Sr, Ge, Nd, Gd and Cu,
M1 and M2 are different elements, and
$0.5 \leq w \leq 1.5$, $0 < x \leq 0.50$, $0 < y \leq 0.20$, $0 \leq z \leq 0.20$, and $0 \leq z' \leq 0.20$).

3. The lithium composite oxide of claim 1, wherein the atomic ratio (B/Ni) of boron (B) and nickel (Ni) in the lithium composite oxide has a gradient that decreases from a surface region of the lithium composite oxide to a core region of the lithium composite oxide.

4. The lithium composite oxide of claim 1, comprising:
a coating layer in which a boron (B)-containing oxide is present, which covers at least a part of an interface between the primary particles, or at least a part of the surface region of the secondary particles, or both at least the part of the interface between the primary particles and at least the part of the surface region of the secondary particles.

5. The lithium composite oxide of claim 4, wherein the coating layer further comprises at least one oxide represented by Formula 2 below:

$$Li_aM3_bO_c$$ [Formula 2]

(Here, M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 6$, $0 \leq b \leq 8$, and $2 \leq c \leq 13$).

6. The lithium composite oxide of claim 5, wherein the coating layer comprises:
a first oxide layer covering a part of the surface region of the secondary particles; and
a second oxide layer covering another part of the surface region of the secondary particles, which is not covered by the first oxide layer, and covering the surface of the first oxide layer,
wherein the at least one oxide represented by Formula 2 is present in the first oxide layer, and the boron-containing oxide is present in the second oxide layer.

7. A lithium secondary battery using a positive electrode comprising the lithium composite oxide according to claim 1.

* * * * *